Dec. 22, 1959
C. L. BROWN
2,918,303
DEVICE FOR REGULATING THE RESPONSE RATE
OF FLUID SUSPENSION LEVELING VALVES
Filed March 18, 1957
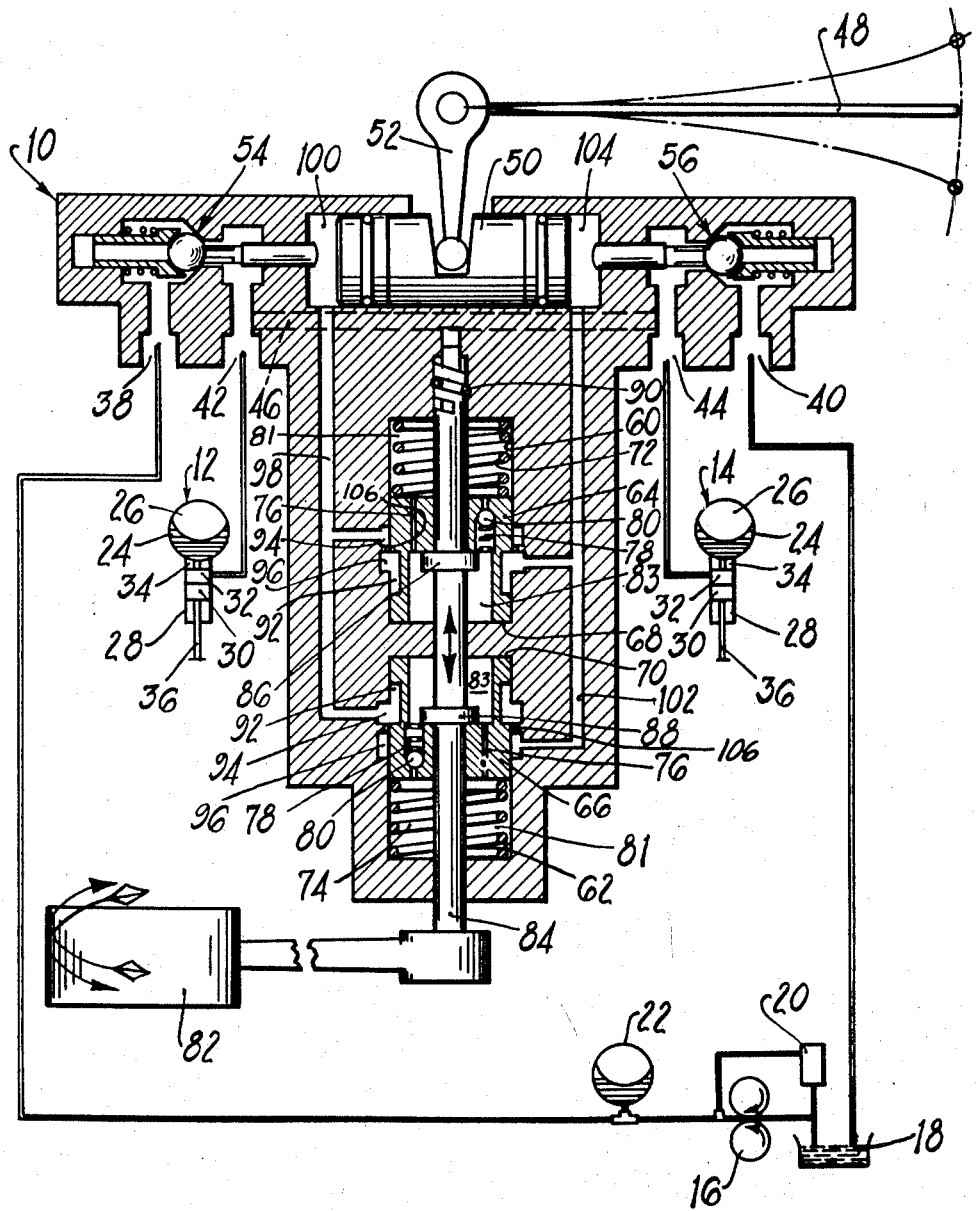
INVENTOR.
CURTIS L. BROWN
BY
William N. Antonie
ATTORNEY _United States Patent Office_

2,918,303
Patented Dec. 22, 1959

2,918,303

DEVICE FOR REGULATING THE RESPONSE RATE OF FLUID SUSPENSION LEVELING VALVES

Curtis L. Brown, South Bend, Ind., assignor to Bendix Aviation Corporation, South Bend, Ind., a corporation of Delaware Application March 18, 1957, Serial No. 646,910

15 Claims. (Cl. 280—124)

This invention relates to a fluid suspension system for a vehicle and more particularly to a device for controlling the rate of response of an automatic leveling valve in such suspension system.

In order to achieve the best possible riding characteristics under various load and road conditions, it is highly desirable to have an automatic leveling valve which will correct for changes in the height of the vehicle due to increase of decrease in loading, and in addition correct for the usual "roll," "dive" and "squat" attitudes that may be assumed by a vehicle as a result of the inertia forces developed while turning, braking or accelerating. On the other hand, it would be highly undesirable to attempt to correct for irregularities in the road such as a single bump or to correct for single wheel disturbances of a short duration arising as a result of load irregularities, since time would not permit the correction to be effected before the wheels had resumed their normal position. Correcting for such minor irregulaties or disturbances would simply result in a continuous "hunt" for a balanced vehicle position and result in high fluid consumption or drain of the hydraulic system.

By incorporating a damping means or dashpot in the leveling valve actuating mechanism, it is possible to retard or delay the action of the vehicle input signals, thereby preventing the leveling valve from instantaneously admitting or releasing pressurized fluid from the suspension unit or units. Thus, with the aid of such damping means, minor road irregularities and single wheel disturbances due to load irregularities would not actuate the leveling valve unless prolonged for a predetermined time interval. However, to delay the action of all of the input signals would naturally also delay the action of the input signals received as a result of vehicle "roll," "drive" and "squat." It is, therefore, an object of this invention to provide a device which would permit the damping means associated with the valve actuating mechanism to operate under certain conditions and not under other conditions.

Another object of this invention is to provide an inertia controlled device for regulating the rate of response of an automatic leveling valve in a fluid suspension system.

A further object of this invention is to provide a leveling valve, having a normally slow response rate, with means incorporated therewith for providing a fast valve response rate during certain vehicular activities.

A still further object of this invention is to provide an automatic leveling valve having novel means for permitting the inertia forces developed while turning, braking or accelerating to modify the function of the leveling valves in order to eliminate the usual "roll," "drive" and "squat" attitudes of a vehicle.

The above and other objects and features of the invention will become apparent from the following description of the apparatus taken in connection with the accompanying drawing which forms a part of this specification.

The figure in the drawing illustrates the apparatus of this invention.

Referring to the drawing it will be seen that I have shown an automatic leveling valve 10 for regulating suspension units 12 and 14 in connection with a central hydraulic system which may consist of a pump 16, a reservoir 18, an accumulator charging valve 20 and an accumulator 22. Each suspension unit includes an accumulator 24 having a bladder 26 for confining a quantity of compressed gas, a hydraulic cylinder 28 having a piston 30 reciprocable therein, a hydraulic chamber 32 formed between the bladder 26 and the piston 30 and a damping valve 34 located in chamber 32. A strut 36 extending from each of the pistons 30 may be connected to wheel attaching members (not shown), while the cylinders 28 may be suitably connected to the frame of the vehicle (not shown). The construction of the suspension units is such that they will tend to act as shock absorbers.

Automatic leveling valve 10 has an inlet port 38, a return port 40, and two cylinder ports 42 and 44 which are connected to each other by passage 46. The position input signals obtained as a result of relative movement between the vehicle body and the wheels are transmitted to the leveling valve 10 through an elastic means illustrated as leaf spring lever 48. This signal in turn is transmitted to a dashpot piston 50 via lever 52. The dashpot piston is shown as having a predetermined travel or lost motion before engaging admission valve 54 or exhaust valve 56 which, respectively, admit or exhaust pressure fluid to and from the connected suspension units 12 and 14. The admission or exhaust of fluid from chamber 32 of the suspension units will result in a raising or lowering of the vehicle in response to the received signal.

An inertia controlled device shown connected to the automatic leveling valve 10 includes a bore 60 and a bore 62. Pistons 64 and 66 are reciprocable in bores 60 and 62, respectively, and are urged against shoulders 68 and 70 by springs 72 and 74. In each of the pistons 64 and 66 is a restriction 76 and a passage 78 having a check valve 80 therein which permit communication between chambers 81 and 83 of bore 60 and between chambers 81 and 83 of bore 62. As a result of having the restrictions and check valves, free flow of fluid through the pistons is permitted when the pistons move against the springs, and restricted flow of fluid through the pistons when they are urged by the springs toward their respective shoulders. A weight 82 is pivotally connected to a rotatable and axially movable shaft 84 having flanges 86 and 88 abutting pistons 64 and 66 respectively. A spiral groove and ball means 90 is provided at one end of the shaft in order to provide axial movement of the shaft upon rotation thereof. This movement could also be accomplished by a yoke arrangement connecting the weight 82 directly or indirectly to the shaft. An annular channel 92 is formed on each of the pistons 64 and 66 and annular channels 94 and 96 are formed in each of the bores 60 and 62. Passage 98 communicates annular channels 94 of each of the bores to chamber 100 adjacent one end of dashpot piston 50 while passage 102 communicates the other annular channels 96 of each bore to chamber 104 adjacent the other side of the dashpot piston 50. Radial clearance is provided between pistons 64, 66 and their respective bores 60, 62 at points 106 in order to permit restricted flow of fluid between chambers 100 and 104. Such restricted flow could also be achieved by providing a restriction in dashpot piston 50.

In general the operation of the device will be as follows:

With the vehicle at rest any load changes which may occur will cause a position signal to be transmitted to the leveling valve or valves, but due to the resistance encountered by the dashpot piston 50 in the valve, this signal results at first only in a deflection of the leaf spring lever 48. If the position signal persists for a predetermined time interval the continuous force exerted against the dashpot piston 50 moves the piston through its lost motion interval until it engages the appropriate admission valve 54 or exhaust valve 56 and thereby permits flow of fluid into or out of the appropriate suspension units until the input signal is reduced to zero. If the vehicle is traveling along a straight highway and the wheels are raised or lowered by highway irregularities the corresponding signal transmitted to the valve will result in the deflection of the leaf spring lever 48, but since these signals will have only a short duration, no admission or exhaust of fluid to the suspension units will occur. Thus, under normal straight ahead driving conditions the leveling valve has a normally slow response rate, since the damping means associated therewith provide for a time delay in the actuation of the valves. If, however, during acceleration or deceleration the vehicle tends to assume a "squat" or "dive" attitude as a result of the inertia forces acting on the vehicle, these same inertia forces will act on the inertia weight 82 tending to move it outside of its normal at rest position and cause shaft 84 to rotate and also move in an axial direction as a result of the spiral groove and ball means 90. If the movement of the weight is in a clockwise direction the shaft 84 will move in a downward direction causing piston 66 to move and displace fluid from chamber 81 through check valve 80, simultaneously loading return spring 74 and communicating annular channels 94 and 96 of the bore 62 with each other, via annular channel 92 in the piston 66. As a result of this movement, an unrestricted connection between chambers 100 and 104 of the valve damping means will be provided. Since chambers 100 and 104 are placed in unrestricted communication with each other, the damping action is obviated and an instantaneous response to the position signal will occur so that fluid may be valved into or relieved from the suspension units 12 and 14 as required. Movement of the weight 82 in a counterclockwise direction will cause the shaft 84 to move in an upward direction, thereby moving piston 64 against spring 72 so as to communicate the annular channels 94 and 96 of the bore 60 with each other via the annular channel 92 of piston 64. It should be noted that one of the novel features of this device is that the weight 82 is free at any time to move in a reverse direction without affecting the fast valve response rate resulting from its first initial movement. This is because the restriction 76 in the piston provides the necessary delay for full vehicle correction to take place before spring 74 returns the piston to its normal restricting position. Thus, when the inertia forces cease to act on the vehicle, the damping means will continue to be inoperative for a predetermined time interval so that any position signals opposite to those previously received can instantaneously valve fluid pressure into or relieve fluid pressure from the suspension units 12 and 14 as required.

By controlling each of the front fluid suspension units by separate leveling valves, each valve being controlled by an inertia controlled device, such as I have described, vehicle "roll" attitudes can also be eliminated. Thus, when the vehicle enters a curve in the road, the centifugal forces acting on the vehicle will also act on the inertia weight 82 (or weights) which controls each of the leveling valves of the type shown by the numeral 10, thereby causing the shaft 84 to move either the piston 64 or the piston 66 depending upon the direction of rotation of the weight. As previously discussed, the movement of either one of the pistons will render the damping action of dashpot piston 50 inoperative and thereby permit instantaneous leveling upon the transmission of the position signal to the leveling valves. Thus when the vehicle enters the curve and it begins to "roll," one of the suspension units will be relieved of pressure and the other will have more fluid pressure valved into it. When the vehicle leaves the curve the unequal pressures in the two units which created a moment tending to "oppose" roll will tend to move the vehicle body into a roll position opposite to that previously assumed. Since restrictions 76 of the pistons provide the necessary time delay before dashpot piston 50 becomes operative once again, the position signals conveyed to the leveling valves will cause an instantaneous valving in and relieving of fluid from the appropriate suspension units to return the vehicle to its normal level position.

The leveling valve shown in the drawing is shown only for descriptive purposes, as it is conceivable that this device would function equally well with leveling valves of different configurations which may or may not use hydraulic restrictions to provide a normally slow response rate. It is also conceivable that the mass 82, as shown in the drawing, could also, by use of appropriate linkages, operate in more than one plane.

Although my invention has been described in connection with certain specific embodiments the principles are susceptible of numerous other applications that will readily occur to persons skilled in the art. Having thus described the various features of my invention what I claim as new and desire to secure by Letters Patent is:

1. In a fluid suspension system having suspension means, a pressure source, and a reservoir, an automatic leveling mechanism having a variable response rate for regulating the pressure in said suspension means, said mechanism comprising a housing, an admission valve in said housing for communicating said suspension means with said pressure source, an exhaust valve in said housing for communicating said suspension means with said reservoir, a first chamber formed in said housing between said admission and exhaust valves, a damping member movabe in said first chamber for opening said admission and exhaust valves, actuating means connected to said damping member for moving said member, second and third chambers formed in said housing, two annular channels formed in each of said second and third chambers, first passage means communicating one of said annular channels of each of said second and third chambers with one side of said damping member, second passage means communicating the other of said annular channels of each of said second and third chambers with the other side of said damping member, a piston reciprocable in each of said second and third chambers for controlling the rate of movement of said damping member, an annular channel formed on each of said pistons for communicating the annular channels in each of said second and third chambers with each other upon movement of the associated piston, means in each of said pistons for permitting free flow of fluid therethrough when said pistons move in one direction and restricting flow of fluid therethrough when said pistons move in the opposite direction, a rotatable and axially movable shaft associated with said pistons for moving one of said pistons in one direction and the other of said pistons in the opposite direction, resilient means associated with each of said pistons for opposing movement thereof in one direction, a weight movable from a normally neutral position as a result of inertia forces acting thereon, said weight being connected to said shaft for imparting rotative motion thereto, and means associated with said shaft for imparting axial motion to said shaft upon rotation thereof.

2. In a fluid suspension system having leveling valve means, actuating means for actuating said valve means, and damping means associated with said actuating means for providing a time delay in the actuation of said valve means, an inertia controlled device associated with said damping means for eliminating said time delay, said device comprising a housing having first and second bores, two annular channels formed in each of said bores, first passage means communicating one of said annular channels of each of said bores with said damping means, second passage means communicating the other of said annular channels of each of said bores with said damping means, a piston reciprocable in each of said bores for controlling the damping action in said damping means, an annular channel formed on each of said pistons for communicating the annular channels in each of said bores with each other upon movement of the associated piston, means in each of said pistons for permitting free flow of fluid therethrough when said pistons move in one direction and restricting flow of fluid therethrough when said pistons move in the opposite direction, a rotatable and axially movable shaft associated with said pistons for moving one of said pistons in one direction and the other of said pistons in the opposite direction, resilient means associated with each of said pistons for opposing movement thereof in one direction, a weight movable from a normally neutral position as a result of inertia forces acting thereon, said weight being connected to said shaft for imparting rotative motion thereto, and means associated with said shaft for imparting axial motion to said shaft upon rotation thereof.

3. In a fluid suspension system having leveling valve means, actuating means for actuating said valve means, and damping means associated with said actuating means for providing a time delay in the actuation of said valve means, an inertia controlled device associated with said damping means for eliminating said time delay, said device comprising a housing having a first and second bore, passage means communicating each of said bores with said damping means, a piston reciprocable in each of said bores for controlling the damping action in said damping means, a passage in each of said pistons for communicating the opposite sides of said piston with each other, said passage having a check valve therein, a restriction in each of said pistons for communicating the opposite sides of said piston with each other, a rotatable and axially movable shaft associated with said pistons for moving one of said pistons in one direction and the other of said pistons in the opposite direction, resilient means associated with each of said pistons for opposing movement thereof, a weight movable from a normally neutral position as a result of inertia forces acting thereon, said weight being connected to said shaft for imparting rotative motion to said shaft, and means associated with said shaft for imparting axial motion to said shaft upon rotation thereof.

4. In a fluid suspension system having suspension means, a pressure source, and a reservoir, an automatic leveling mechanism having a variable response rate for regulating the pressure in said suspension means, said mechanism comprising an admission valve for communicating said suspension means with said pressure source, an exhaust valve for communicating said suspension means with said reservoir, a chamber formed between said admission and exhaust valves, a damping member movable in said chamber for opening said admission and exhaust valves, actuating means connected to said damping member for moving said member, a housing having a first and second bore, passage means for communicating the opposite sides of said damping member with each of said bores, a piston reciprocable in each of said bores for controling the rate of movement of said damping member, means in each of said pistons for permitting free flow of fluid therethrough when said pistons move in one direction and restricting flow of fluid therethrough when said pistons move in the opposite direction, a rotatable and axially movable shaft associated with said pistons for moving one of said pistons in one direction and the other of said pistons in the opposite direction, movement of either of said pistons resulting in communication between the opposite sides of said damping member, a weight movable from a normally neutral position as a result of inertia forces acting thereon, said weight being connected to said shaft for imparting rotative motion thereto, and means associated with said shaft for imparting axial motion to said shaft upon rotation thereof.

5. In a fluid suspension system having leveling valve means, actuating means for actuating said valve means, and damping means associated with said actuating means for providing a time delay in the actuation of said valve means, an inertia controlled device associated with said damping means for eliminating said time delay, said device comprising a first bore, a second bore, passage means for communicating each of said bores with said damping means, a piston reciprocable in each of said bores for controlling the damping action in said damping means, means in each of said pistons for permitting free flow of fluid therethrough when said pistons move in one direction and restricting flow of fluid therethrough when said pistons move in the opposite direction, a rotatable and axially movable shaft associated with said pistons for moving one of said pistons in one direction and the other of said pistons in the opposite direction, resilient means associated with each of said pistons for opposing movement thereof, a weight movable from a normally neutral position as a result of inertia forces acting thereon, said weight being connected to said shaft for imparting rotative motion thereto, and means associated with said shaft for imparting axial motion to said shaft upon rotation thereof.

6. In a fluid suspension system having leveling valve means, actuating means for actuating said valve means, and damping means associated with said actuating means for providing a time delay in the actuation of said valve means, an inertia controlled device associated with said damping means for eliminating said time delay, said device comprising a first chamber, a second chamber, passage means communicating each of said chambers with said damping means, a piston reciprocable in each of said chambers for controlling the damping action in said damping means, means for communicating the opposite sides of each of said pistons with each other, said last named means permitting free flow of fluid therethrough when said pistons move in one direction and restricting flow of fluid therethrough when said pistons move in the opposite direction, a rotatable and axially movable shaft associated with said pistons for moving one of said pistons in one direction and the other of said pistons in the opposite direction, resilient means associated with each of said pistons for opposing movement thereof, a weight movable from a normally neutral position as a result of inertia forces acting thereon, said weight being connected to said shaft for imparting rotative motion thereto, and means associated with said shaft for imparting axial motion to said shaft upon rotation thereof.

7. In a fluid suspension system having suspension means, a pressure source, and a reservoir, an automatic leveling mechanism having a variable response rate for regulating the pressure in said suspension means, said mechanism comprising an admission valve for communicating said suspension means with said pressure source, an exhaust valve for communicating said suspension means with said reservoir, a first chamber formed between said admission and exhaust valves, a damping member movable in said first chamber for opening said admission and exhaust valves, actuating means connected to said damping member for moving said member, dashpot means having a second chamber therein, second dashpot means having a third chamber therein, passage means for communicating the opposite sides of said damping member with each of said second and third chambers, a piston reciprocable in each of said second and third chambers for controlling the rate of movement of said damping member, means for communicating the opposite sides of each of said pistons with each other, said last named means permitting free flow of fluid therethrough when said pistons move in one direction and restricting flow of fluid therethrough when said pistons move in the opposite direction, inertia controlled means associated with said pistons for moving one of said pistons in one direction and the other of said pistons in the opposite direction, and resilient means associated with each of said pistons for opposing movement thereof.

8. In a fluid suspension system having leveling valve means, actuating means for actuating said valve means, and damping means associated with said actuating means for providing a time delay in the actuation of said valve means, an inertia controlled device associated with said damping means for eliminating said time delay, said device comprising a first dashpot means having a chamber, a second dashpot means having a second chamber, passage means communicating each of said chambers with said damping means, a piston reciprocable in each of said chambers for controlling the damping action in said damping means, means for communicating the opposite sides of each of said pistons with each other, said last named means permitting free flow of fluid therethrough when said pistons move in one direction and restricting flow of fluid therethrough when said pistons move in the opposite direction, inertia controlled means associated with said pistons for moving one of said pistons in one direction and the other of said pistons in the opposite direction, and resilient means associated with each of said pistons for opposing movement thereof.

9. In a fluid suspension system having suspension means, a pressure source, and a reservoir, an automatic leveling mechanism having a variable response rate for regulating the pressure in said suspension means, said mechanism comprising an admission valve for communicating said suspension means with said pressure source, an exhaust valve for communicating said suspension means with said reservoir, actuating means for opening said admission and exhaust valves, damping means for retarding the admission or exhaust of pressurized fluid to or from the suspension means, dashpot means having first and second chambers therein, passage means communicating with said first and second chambers and with said damping means, a piston reciprocable in each of said first and second chambers for controlling the rate of admission or exhaust of pressurized fluid to or from said suspension means, means for communicating the opposite sides of each of said pistons with each other, said last named means permitting free flow of fluid therethrough when said pistons move in one direction and restricting flow of fluid therethrough when said pistons move in the opposite direction, inertia controlled means associated with said pistons for moving one of said pistons in one direction and the other of said pistons in the opposite direction, and resilient means associated with each of said pistons for opposing movement thereof.

10. In a fluid suspension system having leveling valve means, actuating means for actuating said valve means, and damping means associated with said actuating means for providing a time delay in the actuation of said valve means, an inertia controlled device associated with said damping means for eliminating said time delay, said device comprising first dashpot means having a chamber, second dashpot means having a second chamber, passage means communicating each of said chambers with said damping means, a piston reciprocable in each of said chambers for controlling the damping action in said damping means, means for communicating the opposite sides of said pistons with each other, said last named means permitting free flow of fluid therethrough when said pistons move in one direction and restricting flow of fluid therethrough when said pistons move in the opposite direction, inertia controlled means associated with said pistons for moving said pistons only in the direction in which free flow of fluid is permitted through the pistons, and resilient means associated with each of said pistons for opposing movement thereof.

11. In a fluid suspension system having leveling valve means, actuating means for actuating said valve means, and damping means associated with said actuating means for providing a time delay in the actuation of said valve means, a device associated with said damping means for eliminating said time delay, said device comprising dashpot means having a chamber, passage means communicating said chamber with said damping means, a piston reciprocable in said chamber for controlling the damping action in said damping means, means for communicating the opposite sides of said piston with each other, said last named means permitting free flow of fluid therethrough when said piston moves in one direction and restricting flow of fluid therethrough when said piston moves in the opposite direction, means associated with said piston for moving said piston only in the direction in which free flow of fluid is permitted through the piston, and means associated with said piston for opposing movement thereof.

12. In a fluid suspension system having suspension means, a pressure source, and a reservoir, automatic leveling mechanism having a variable response rate for regulating the pressure in said suspension means, said mechanism comprising an admission valve for communicating said suspension means with said pressure source, an exhaust valve for communicating said suspension means with said reservoir, actuating means for opening said admission and exhaust valves, damping means for retarding the admission or exhaust of pressurized fluid to or from the suspension means, dashpot means having first and second chambers therein, passage means communicating with said first and second chambers and with said damping means, a piston reciprocable in each of said first and second chambers for controlling the rate of admission or exhaust of pressurized fluid to or from said suspension means, means for communicating the opposite sides of each of said pistons with each other, said last named means permitting free flow of fluid therethrough when said pistons move in one direction and restricting flow of fluid therethrough when said pistons move in the opposite direction, means associated with said pistons for moving said pistons only in the direction in which free flow of fluid is permitted through the pistons, and means associated with each of said pistons for opposing movement thereof.

13. In a fluid suspension system having suspension means, a pressure source, and a reservoir, automatic leveling mechanism having a variable response rate for regulating the pressure in said suspension means, said mechanism comprising an admission valve for communicating said suspension means with said pressure source, an exhaust valve for communicating said suspension means with said reservoir, actuating means for opening said admission and exhaust valves, damping means for retarding the admission or exhaust of pressurized fluid to or from the suspension means, dashpot means having a chamber therein, passage means communicating with said chamber and with said damping means, a piston reciprocable in said chamber for controlling the rate of admission or exhaust of pressurized fluid to or from said suspension means, means for communicating the opposite sides of said piston with each other, said last named means permitting free flow of fluid therethrough when said piston moves in one direction and restricting flow of fluid therethrough when said piston moves in the opposite direction, means associated with said piston for moving said piston only in the direction in which free flow of fluid is permitted through the piston, and means associated with said piston for opposing movement thereof.

14. In a fluid suspension system having suspension means, a pressure source, and a reservoir, an automatic leveling mechanism having a variable response rate for regulating the pressure in said suspension means, said mechanism comprising an admission valve for communicating said suspension means with said pressure source, an exhaust valve for communicating said suspension means with said reservoir, a first chamber formed between said admission and exhaust valves, a damping member in said first chamber for opening said admission and exhaust valves, actuating means connected to said damping member for moving said member, first dashpot means having a second chamber therein, second dashpot means having a third chamber therein, passage means for communicating the opposite sides of said damping member with each of said second and third chambers, a piston reciprocable in each of said second and third chambers for controlling the rate of movement of said damping member, means for communicating the opposite sides of each of said pistons with each other, said last named means permitting free flow of fluid therethrough when said pistons move in one direction and restricting flow of fluid therethrough when said pistons move in the opposite direction, means associated with said pistons for moving said pistons only in the direction in which free flow of fluid is permitted through the pistons, and means associated with each of said pistons for opposing movement thereof.

15. In a fluid suspension system having suspension means, a pressure source, and a reservoir, an automatic leveling mechanism having a variable response rate for regulating the pressure in said suspension means, said mechanism comprising an admission valve for communicating said suspension means with said pressure source, an exhaust valve for communicating said suspension means with said reservoir, a first chamber formed between said admission and exhaust valves, a damping member movable in said first chamber for opening said admission and exhaust valves, actuating means connected to said damping member for moving said member, dashpot means having a second chamber therein, passage means for communicating the opposite sides of said damping member with said second chamber, a piston reciprocable in said second chamber for controlling the rate of movement of said damping member, means for communicating the opposite sides of said piston with each other, said last named means permitting free flow of fluid therethrough when said piston moves in one direction and restricting flow of fluid therethrough when said piston moves in the opposite direction, means associated with said piston for moving said piston only in the direction in which free flow of fluid is permitted through the piston, and means associated with said piston for opposing movement thereof.

References Cited in the file of this patent

UNITED STATES PATENTS 1,664,510   Hughes _____ Apr. 3, 1928

OTHER REFERENCES

Germany, H 17,488 11/63C, Mar. 1, 1956.

UNITED STATES PATENT OFFICE
CERTIFICATE OF CORRECTION

Patent No. 2,918,303            December 22, 1959

Curtis L. Brown

It is hereby certified that error appears in the printed specification of the above numbered patent requiring correction and that the said Letters Patent should read as corrected below.

Column 1, lines 48 and 64, for "drive", each occurrence, read -- dive --; column 5, line 59, for "controling" read -- controlling --.

Signed and sealed this 13th day of September 1960.

(SEAL)
Attest:

KARL H. AXLINE

Attesting Officer

ROBERT C. WATSON
Commissioner of Patents